3,373,602
ELECTRONIC SCAN ULTRASONIC
INSPECTION SYSTEM
John A. Wendt, Park Ridge, and Bernard J. Lefebvre,
Schaumberg, Ill., assignors to Magnaflux Corporation,
Chicago, Ill., a corporation of Delaware
Filed Nov. 30, 1964, Ser. No. 414,760
5 Claims. (Cl. 73—67.5)

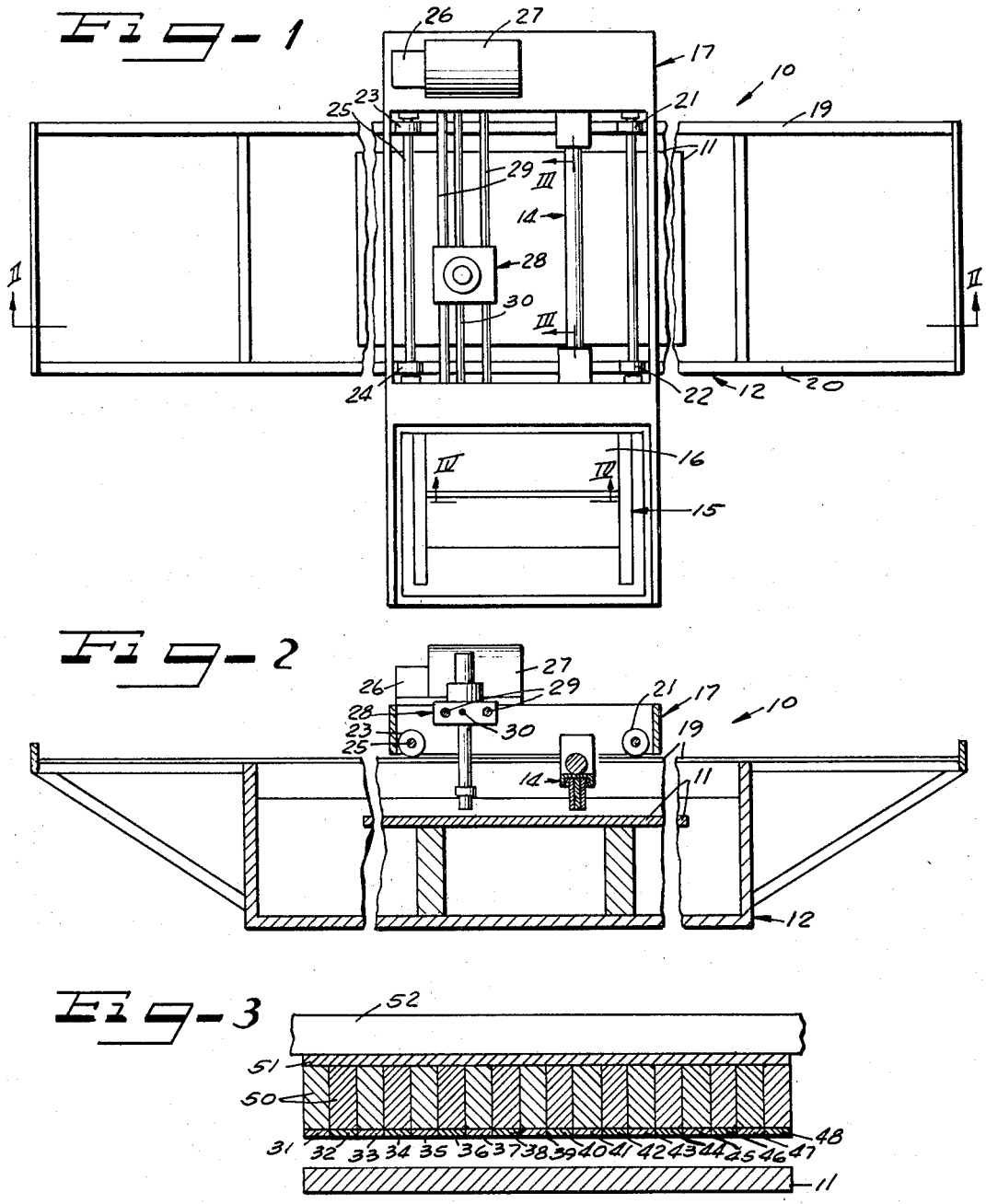
March 19, 1968     J. A. WENDT ET AL     3,373,602
ELECTRONIC SCAN ULTRASONIC INSPECTION SYSTEM
Filed Nov. 30, 1964     4 Sheets-Sheet 1
INVENTOR.
JOHN A. WENDT
BERNARD J. LEFEBVRE

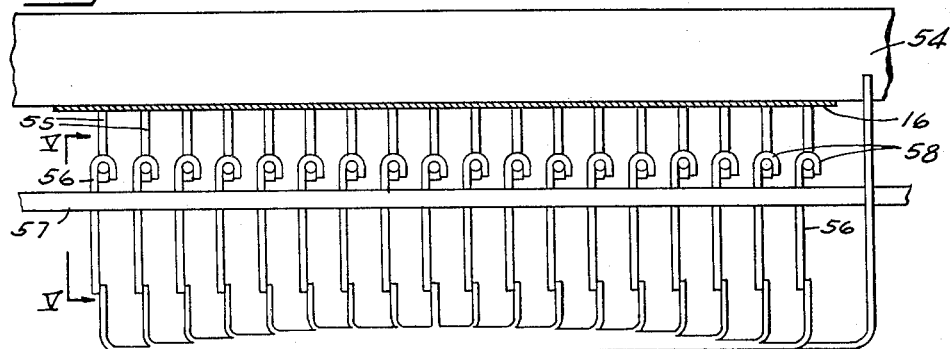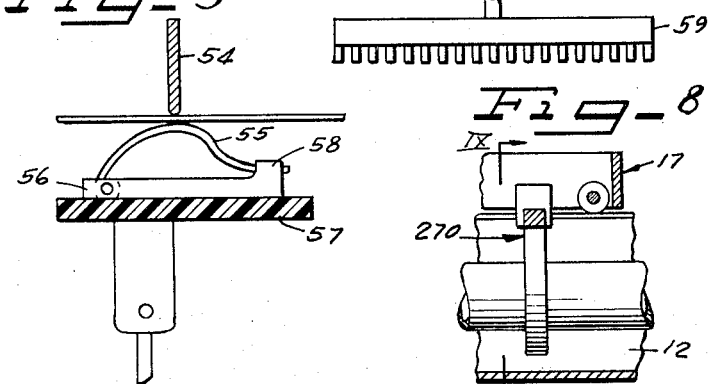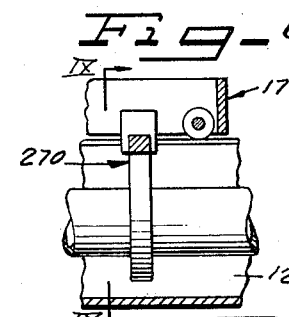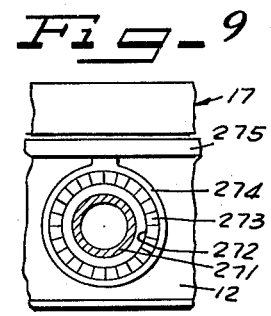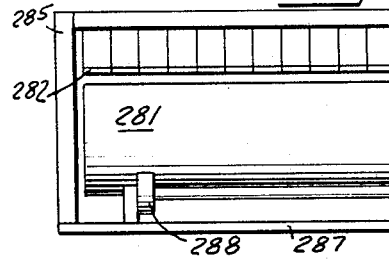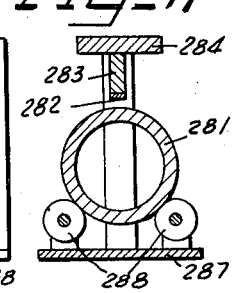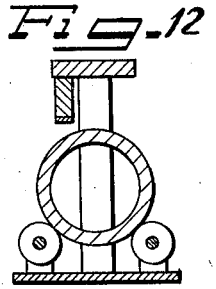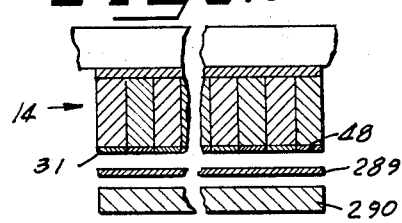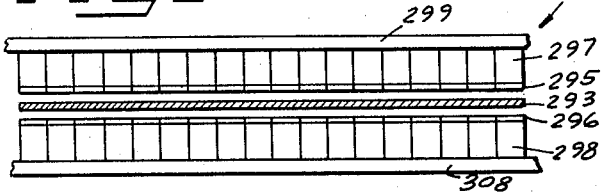
INVENTOR.
JOHN A. WENDT
BERNARD J. LEFEBVRE
ATTORNEYS

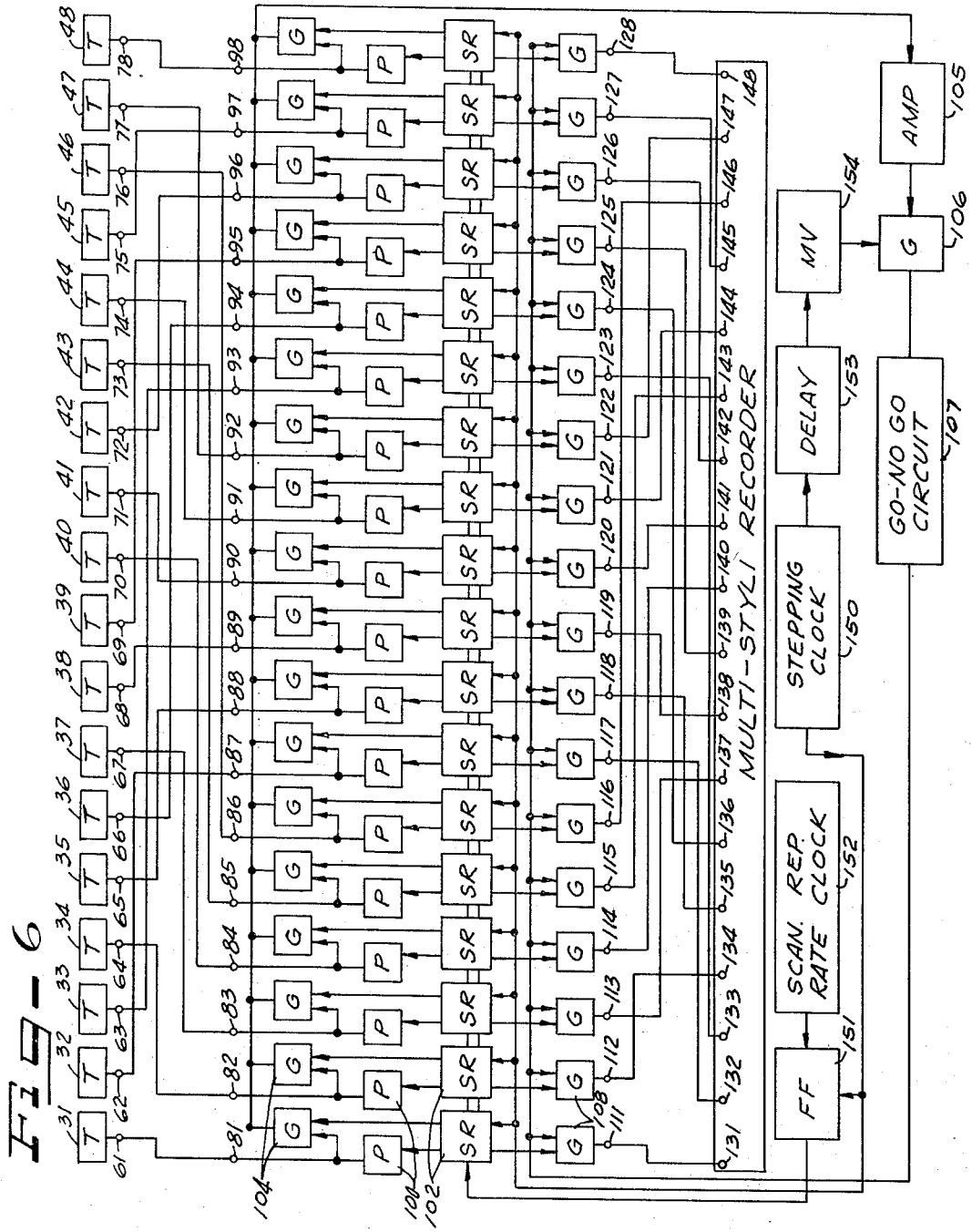

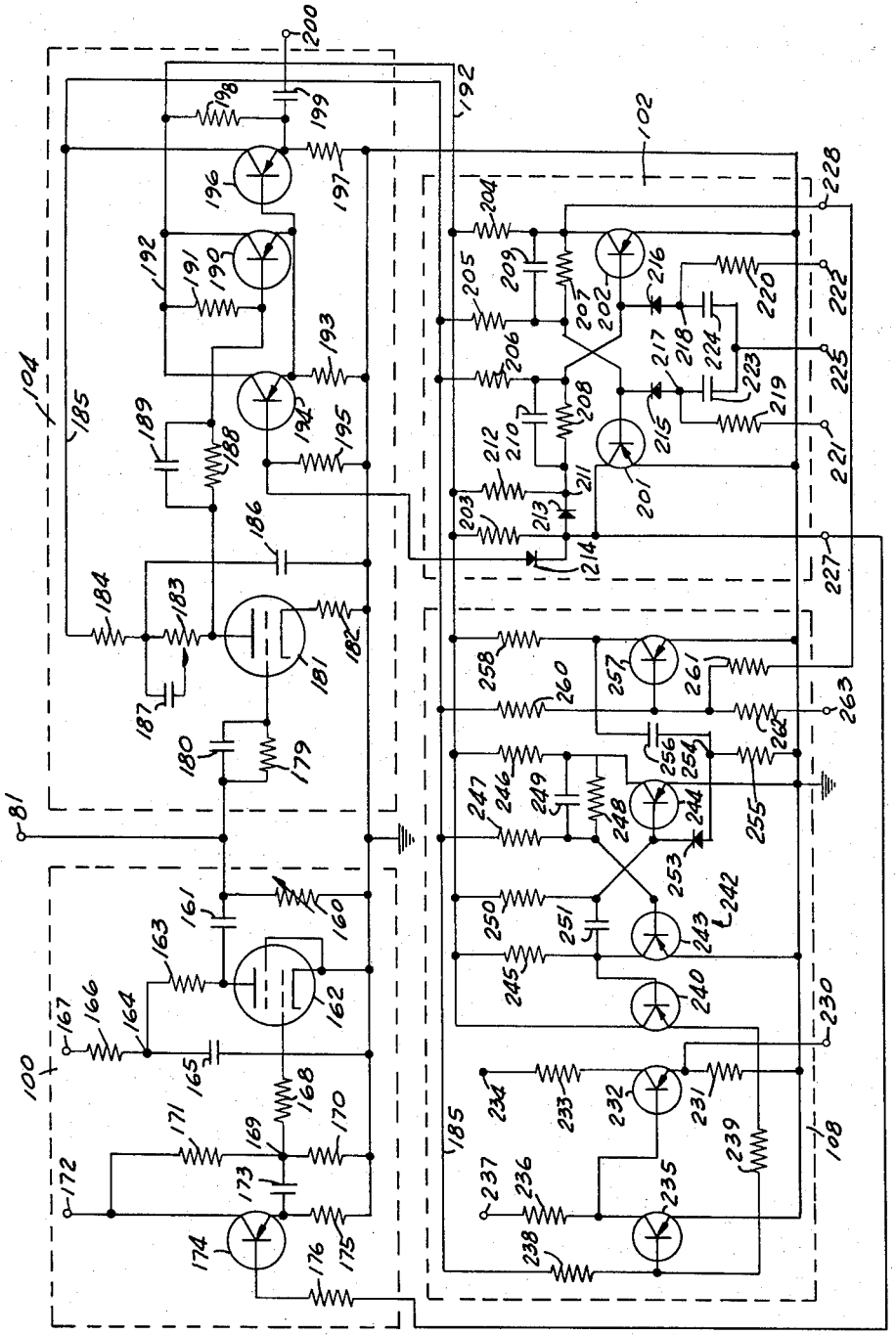

ABSTRACT OF THE DISCLOSURE

An ultrasonic inspection system, especially for testing relatively flat material, comprising a plurality of transducers positioned above the material in spaced across, facing relation to it. The transducers are pulsed to generate ultrasonic pulses in a straggered order, so that no two adjacent transducers pulse consecutively. A gating circuit is connected to the transducers to enable each transducer to transmit electrical signals corresponding to echo pulses received by that transducer from the material as a result of only its own generated pulse to a certain channel of a multi-channel recording device. Each transducer is connected to a separate channel of the recording device, and each channel is positioned to correspond to the position of the transducer to which it is connected. Thus, when each transducer has been pulsed once, a fairly detailed indication is recorded on the device of a cross-section of the tested material.

---

This invention relates to an ultrasonic inspection system and more particularly to an ultrasonic inspection system having an electronic scan system which permits parts to be inspected at an extremely rapid rate of speed but with a high degree of accuracy and reliability, and with excellent resolution capabilities. The system uses a comparatively few number of component parts and is readily constructed, while being rugged and trouble-free in operation. It is also quite versatile and can be readily applied in a variety of testing applications.

The invention was evolved with the specific object of providing a system for inspection of large steel plates such as plates used in making pipe. Such plates, referred to as pipe skelp, may have a thickness of from ¼ to ¾ inch, a width of up to 130 inches and a length of up to 40 feet. At the mill, such plates may be produced at a rapid rate, such as for example at the rate of 800 plates every 24 hours, or one plate every 1.8 minutes.

Eddy current inspection is not applicable to the testing of such plates, because it will only detect defects at or very near to the surface. Radiography will detect internal flaws, but is expensive, relatively slow and hazardous to personnel. Other non-destructive testing methods such as conductivity, beta backscatter, microwaves, corona testing, etc., are not applicable.

Ultrasonic inspection is capable of locating internal flaws, but with conventional mechanical scanning systems, a very large number of search units would be required. For example, to obtain at least one pulse from a defect located at the bottom of a large plate moving at 4 inches per second, approximately 125 scans per second would be required, which would predicate the impossible mechanical scanning rate of 16,650 inches per second, using a single search unit. The scan rate could be reduced by increasing the number of search units on a bridge, with each unit covering one section of the plate. For example, to obtain a practical scan rate of 50 inches per second, 333 search units would be needed, with each one traversing ⅟₃₃ of the workpiece. Such search units would not need to be supported on a single bridge, but might be divided among the number of test stations. Thus ten test stations might be provided having 33 transducers on each bridge at each test station. In any case, such mechanical scanning would be quite complicated, and would also result in a fantastic expense.

According to this invention, transmitting and receiving means are provided for transmitting pulses of ultrasonic energy into a plurality of spaced surface points of a part under test and receiving such pulses after travel through interior portions of the part, and recording means are provided for recording electrical signals generated in response to the received pulses of ultrasonic energy. Preferably, the pulses are transmitted into a relatively large number of points, at least several, so that it is possible to rapidly obtain information as to the interior structure of a substantial portion of the part without high speed movement such as would be required with transverse mechanical scanning using a single transducer.

The transmitting and receiving means preferably comprise a plurality of transducer means each of which may be a single transducer for both transmitting and receiving or one transmitting and one receiving transducer on the same or opposite sides of a part. The transducer means may be located closely adjacent to one another, and it may here be noted that recitation herein of transmission of pulses into spaced surface points of a part has reference to the center lines of ultrasonic beams which may overlap.

Very important features of the invention relate to the pulsing of transducers in a manner such as to permit pulsing at a rapid rate, but without undesirable interference effects due to residual sound. It is found that if all transducers are pulsed from one pulser, it is necessary to wait for a certain time delay period between pulses, due to the time required for sound reverberating in the workpiece to be attenuated below a detectible level. In accordance with this invention, the transducers are pulsed in a staggered order such that there is a large physical separation between transducers which are pulsed consecutively. Thus no two adjacent transducers are pulsed consecutively, with at least one other transducer being pulsed between the pulsing of each transducer and transducers adjacent thereto. By way of example, with a group of transducers numbered 1 through 18, the pulsing order may be 1, 4, 7, 10, 13, 16, 2, 5, 8, 11, 14, 17, 3, 6, 9, 12, 15 and 18. It will be noted that between the pulsing of the number 1 and number 2 transducers, five other transducers are pulsed.

Further important features of the invention relate to circuit arrangements for pulsing of the transducers. In particular, separate pulsers are provided for the transducers and such pulsers are connected to a shift register operative to apply signals to the pulsers, to cause pulsing in the desired order. The shift register is controlled from a stepping clock, and at the beginning of an electronic scan cycle, the stepping clock enters a "one" into the first shift register stage to energize the corresponding pulser, the next pulse from the stepping clock being operative to transfer the "one" from the first stage to the second stage, and so on. With this arrangement, a highly reliable, effective and rapid electronic scan can be achieved.

A specific feature of the invention is in the use of a common amplifier for signals generated in response to received ultrasonic pulses, with gate means energized in accordance with the pulsing order to apply such signals to the input of the common amplifier.

Another very important feature of the invention relates to the provision of a recorder having a plurality of styli means for recording on a recording medium at a plurality of points at spacings proportional to the spacings of the surface points into which the ultrasonic pulses are transmitted. With this arrangement, a pictorial representation of the characteristics of the part under test can be obtained.

Another specific feature of the invention is in the provision of gate means energized in synchronism with the pulsing of the transducers for applying to the styli means the electrical signals generated in response to the received ultrasonic pulses.

In one preferred system, the transducers are arranged generally in a line transverse to a plate which is then moved longitudinally for scanning of the entire surface thereof. The recording medium may be moved in proportion to the longitudinal movement of the plate, to thereby obtain on the recording medium a plan view representation of defects within the plate.

In another preferred arrangement according to the invention, the transducers are arranged generally in a circle facing the axis of a pipe, rod or other elongated member, which may be moved longitudinally for complete scanning thereof.

In still another preferred arrangement, the transducers are arranged in a line facing the axis of a pipe or cylindrical member, which may be rotated for complete scanning thereof.

This invention contemplates other objects, features and advantages which will become more fully apparent from the following detailed description taken in conjunction with the accompanying drawings which illustrate preferred embodiments and in which:

FIGURE 1 is a top plan view of an electronic scan ultrasonic inspection system constructed according to the principles of this invention, designed for the testing of plates;

FIGURE 2 is an elevational sectional view taken substantially along line II–II of FIGURE 1;

FIGURE 3 is an enlarged sectional view taken substantially along line III–III of FIGURE 1, showing the construction of a transducer assembly.

FIGURE 4 is an enlarged sectional view taken substantially along line IV–IV of FIGURE 1, showing a styli arrangement of a recorder;

FIGURE 5 is a sectional view taken substantially along line V–V of FIGURE 4;

FIGURE 6 is a schematic block diagram of electronic control and signal processing circuitry of the inspection system;

FIGURE 7 is a schematic electrical diagram showing the circuits of a pulser, a pre-receiver gate, a styli gate and a shift register stage for one channel of the system;

FIGURE 8 is a side elevational view of a modified system designed for the inspection of pipe or the like, using a ring of transducers;

FIGURE 9 is a sectional view taken substantially along line IX–IX of FIGURE 8;

FIGURE 10 is a side elevational view of another modified system designed for the inspection of pipe or the like, using transducers along the length of the pipe;

FIGURE 11 is a sectional view taken substantially along line XI–XI of FIGURE 10.

FIGURE 12 is a view similar to FIGURE 11, showing angulation of the transducers;

FIGURE 13 is a sectional view showing the use of a back reflection member in inspection of thin plates or the like; and FIGURE 14 is a view showing another modification with transmitting and receiving transducers on opposite sides of a part, for through-transmission inspection.

Reference numeral 10 in FIGURE 1 generally designates an electronic scan ultrasonic inspection system constructed according to the principles of this invention, and designed specifically for the testing of plates or the like. In the system 10, a plate 11 to be inspected is immersed in water in a tank 12 to be scanned ultrasonically by a "paintbrush" transducer assembly 14 constructed according to the principles of this invention, the water being effective to efficiently transmit ultrasonic energy between the transducer assembly 14 and the plate 11.

The transducer assembly 14 comprises a plurality of transducers (18 in the illustrated embodiment) which are pulsed in a predetermined order to transmit pulses of ultrasonic energy down through the water into the plate 11. Echo signals from the upper and lower surfaces of the plate 11 and from flaws or inhomogeneities therein are received by the transducer elements and are applied through signal processing circuitry described below to a plurality of styli of a chart recorder 15, to produce marks on a recording medium 16 in response to flaws or inhomogeneities in the plate 11.

Thus the plate 11 is scanned across its width to produce marks across the width of the recording medium 16.

For longitudinal scanning of the plate 11, the "paintbrush" transducer assembly 14 is supported on a bridge structure 17 which is supported on a pair of rails 19 and 20 along the sides of the tank 12, by means of rollers 21, 22, 23 and 24. Rollers 23 and 24 are secured on a shaft 25 which is driven through a gear reduction and coupling unit 26 from a reversible electric motor 27. The shaft 25 is also coupled mechanically to conventional drive means in the recorder 15, to drive the recording medium 16 in proportion to the longitudinal movement of the bridge 17.

For evaluation of flaws detected by the "paintbrush" transducer assembly 14, and for calibration and other purposes, a conventional scanning transducer assembly 28 is mounted on the bridge 14 by means of guide bars 29, for transverse movement under the control of a lead screw 30.

As shown in FIGURE 3, the transducer assembly 14 comprises 18 rectangular piezoelectric transducer elements 31–48 mounted in side-by-side relation on the lower ends of mounting blocks 50 which are supported from a plate 51 secured to a bar 52 which is supported on the bridge 17. The elements 31–48 may preferably be piezoelectric ceramics, or may be quartz crystals, or any other equivalent. Care should be taken to insure that the angle of cut (or polarization normality in a piezoelectric ceramic) be highly accurate to insure that the sonic axes of the elements will be accurately colinear with the mechanical axes and in parallel relation. Likewise, the mounting blocks 50 and the plate 51 should be accurately formed. To obtain uniform and unvarying transmission and reception of energy from all transducer elements, mounting blocks 50 are preferably of solid, homogeneous, stable non-plastic absorbing material, and the bonds used to hold the elements together should be uniformly and accurately formed, and preferably the bond thicknesses should be not greater than $\frac{1}{25}$ wavelength at the maximum frequency of operation.

FIGURES 4 and 5 show the construction of styli means of the recorder 15, wherein a conventional planar electrode 54 extends across the recording medium 16 in engagement with the upper surface thereof. In place of a conventional helical electrode carried on a drum for engagement with the lower surface of the medium 16, a multiple electrode arrangement is used, wherein resilient spring wire electrodes 55 have ends secured to terminal plates 56 which are mounted on a strip 57 of Teflon or other insulating material. Plates 56 have projections 58 extending over the free ends of the spring electrodes 55 to limit upward movement thereof. Plates 56 are connected through wires to terminals of a connector 59 for connection to circuitry which applies signals thereto corresponding to pulses received by the transducer elements 31–48. More than 18 electrodes 55 are provided in the illustrated system, for recording of reference data.

Referring now to FIGURE 6, the transducer elements 31–48 have electrodes connected to terminals 61–78, which are connectable to terminals 81–98 to which energizing pulses are sequentially applied.

In the illustrated system, and in accordance with very important feature of the invention, a staggered pulsing order is used with no two adjacent transducer elements being pulsed consecutively. This substantially eliminates a residual sound problem which would otherwise be encountered due to the time required for sound reverberating in the test piece to be attenuated below a detectable level. As a result, a much higher speed of operation is possible, with greatly improved results.

Connections are illustrated for a pulsing order of 1, 4, 7, 10, 13, 16, 2, 5, 8, 11, 14, 17, 3, 6, 9, 12, 15, 18, considering the element 31 as the number one transducer element and the element 48 as the number 18 transducer element. Thus terminal 81 is connected to terminal 61, terminal 82 is connected to terminal 64, terminal 83 is connected to terminal 67, etc.

Other pulsing orders are, of course, possible. The above noted pulsing order is quite satisfactory, particularly for relatively thick plates. For thin plates, a pulsing order of 1, 7, 13, 2, 8, 14, 3, 9, 15, 4, 10, 16, 5, 11, 17, 6, 12, 18 may be used.

In accordance with a further feature of the invention, terminals 81–98 are connected to individual pulsers 100 which are controlled from a series of shift register stages 102 connected in cascade. Terminals 81–98 are also connected through gates 104 to the input of an amplifier 105, gates 104 being each opened from the corresponding shift register stage 102 when an energizing signal is applied to the corresponding pulser 100.

The output of the amplifier 105 is applied to a gate 106 which is opened in synchronism with the pulsing of the transducers, but only for a time interval corresponding to the reception of signals from the interior portion of the plate in which it is desired to detect the presence or absence of flaws. The output of gate 106 is applied through a threshold or "GO-NO-GO" circuit 107 to the inputs of 18 gates 108 having enabling inputs connected to the shift register stages 102 and having outputs connected to terminals 111–128. Terminals 111 are connected to input terminals 131–148 of the recorder, which are connected to the wire electrodes 55. A staggered connection is used corresponding to the staggered connection of the transducer elements 31. Thus in the illustrated circuit, the first terminal 131 is connected to the terminal 111, the second terminal 132 is connected to the terminal 114, the third terminal 133 is connected to the terminal 117, etc.

To operate the shift register stages 102, they are all connected to a stepping clock 150 which determines the scanning rate. By way of example, the stepping clock may be adjustable to operate at any rate within the range of from 1,000 to 20,000 pulses per second. The first stage 102 is additionally connected to a bistable circuit or flip-flop 151 which is connected to the stepping clock 150 and also to a scanning repetition rate clock 152. Clock 152 determines the rate at which the transverse electronic scanning operation is repeated and may for example be adjustable to operate at any rate of from 50 to 1000 pulses per second.

In operation, the shift register stages 102 may all be in an inoperative condition with a "zero" stored therein, with no enabling signals being applied to the pulsers 100 or the gates 104 and 108. When a pulse is applied from the scanning repetition rate clock 152 to the flip-flop 151, the flip-flop is placed in a "set" condition. The next pulse from the stepping clock 150 resets the flip-flop 151 which then applies a signal to the first shift register stage 102 to place the first stage 102 in an operative condition with a "one" being stored therein. The first pulser 100 connected to the terminal 81 is then operated to apply a pulse to the first transducer element 31, and the gates 104 and 108 are opened. The next pulse from the stepping clock 150 operates on the first shift register stage 102 to place it in its initial "zero" condition and to cause it to apply a signal to the second shift register stage, placing it in its operative condition, with a "one" being stored therein.

The second pulser 100 and the second gates 104 and 108 are then operative. With subsequent pulses applied from the stepping clock, the "one" is shifted to succeeding stages until the "one" is shifted out of the final stage. The shift register is then dormant until another pulse is applied from the scanning repetition rate clock 152 to the flip-flop 151.

Signals from the stepping clock 150 are also applied through a delay circuit 153 to a monostable multivibrator 154 which opens the gate 106 for an appropriate time interval, to cause response only to pulses reflected from flaws in the interior portion of the plate where inspection is desired.

FIGURE 7 is a schematic electrical diagram showing the circuits of the pulser 100, the gate 104, the gate 108 and a shift register stage 102, for the first channel of the system.

Referring thereto, terminal 81 is connected through an adjustable damping resistor 160 to ground and is also connected through a capacitor 161 to the plate of a thyratron pulser tube 162, the plate of tube 162 being also connected through a resistor 163 to a circuit point 164 connected through a capacitor 165 to ground and through a resistor 166 to a terminal 167 to which a positive supply voltage is applied. When a signal is applied to the grid of the thyratron 162 the plate voltage thereof is dropped to a relatively low value, and through the capacitor 161, a large negative voltage is applied to the transducer element connected to the terminal 81, to shock the element into vibration at its natural resonant frequency and to cause transmission of a pulse of ultrasonic energy toward the plate under test.

The grid of the thyratron 162 is connected through a resistor 168 to a circuit point 169 connected through a resistor 170 to ground, through a resistor 171 to a terminal 172, to which a negative voltage (12 volts) is applied and also through a capacitor 173 to the emitter of a transistor 174, which is connected through a resistor 175 to ground. The collector of the transistor 174 is connected to the terminal, while the base thereof is connected through a resistor 176 to the shift register stage 102. A signal is normally applied from the shift register stage through resistor 176 to the base of the transistor 174 to maintain the transistor 174 conductive. When the signal is removed, the potential of the emitter moves in a positive direction to apply a positive signal through capacitor 173 to the grid of the thyratron 162 to render it conductive.

Terminal 81 is also connected through the parallel combination of a resistor 179 and a capacitor 180 to the grid of a triode amplifier tube 181 having a cathode connected to ground through a resistor 182 and having a plate connected through a potentiometer 183 and a resistor 184 to a line 185 to which a positive supply voltage is applied. The junction between potentiometer 183 and resistor 184 is connected through a capacitor 186 to ground and also through a capacitor 187 to the movable contact of the potentiometer 183, for obtaining the desired gain and response characteristics. The plate of the triode 181 is connected through the parallel combination of a resistor 188 and a capacitor 189 to the base of a transistor 190, the base being also connected through a resistor 191 to a line 192, to which a negative supply voltage (12 volts) may be applied. The collector of transistor 190 is connected to the line 192 while the emitter thereof is connected through a resistor 193 to ground.

For gating purposes, another transistor 194 is provided having emitter and collector electrodes connected directly to the emitter and collector electrodes of the transistor 190 and having a base electrode connected through a resistor 195 to ground and to an output from the shift register stage 102. Transistor 194 is controlled so as to permit the transistor 190 to develop an output signal across the resistor 193 only at the desired time.

The output signal so developed across resistor 193 is applied to the base of a transistor 196 having a collector connected to the line 185 and having an emitter connected through a resistor 197 to ground through a resistor 198 to the line 192, and through a capacitor 199 to an output terminal 200 which is connected to the input of the amplifier 105.

The shift register stage 102 comprises a pair of transistors 201 and 202 having emitters connected to ground, collectors connected through resistors 203 and 204 to the negative voltage supply line 192 and bases connected through resistors 205 and 206 to the positive voltage supply line 185 and also through resistors 207 and 208 and capacitors 209 and 210 to the collector of the transistor 202 and to a circuit point 211 connected through a resistor 212 to the line 192 and connected through a diode 213 to the collector of the transistor 201. With this cross-connection of the collector and base electrodes, one of the transistors 201 and 202 is rendered conductive with the other being cut-off. Normally the left-hand transistor 201 is cut-off, with a "zero" being then stored in the shift register stage. When the stage is shifted to the opposite state, to store a "one" therein, the left-hand transistor 201 is rendered conductive whereupon the potential of the collector thereof rises from a value close to the potential of the negative supply line 192 to a value close to ground potential. Thus a positive signal is applied to the base of the emitter-follower transistor 174 which then applies a positive signal to the grid of the thyratron 162.

At the same time, when the transistor 201 is rendered conductive, the potential of the cathode of a diode 214 connected to the collector of the transistor 201 is elevated so that the diode 214 cannot conduct, and a negative signal normally applied to the base of the transistor 194 is removed. Received signals are then applied through the transistors 190 and 196 to the output terminal 200.

For controlling operation of the shift register stage 102, the base electrodes of the transistors 201 and 202 are connected through diodes 215 and 216 to circuit points 217 and 218 which are connected through resistors 219 and 220 to terminals 221 and 222, circuit points 217 and 218 being also connected through capacitors 223 and 224 to a terminal 225. Additional terminals 227 and 228 are connected to the collectors of the transistors 201 and 202.

Terminal 225 of all shift register stages is connected to the stepping clock 150. In all shift register stages, with the exception of the first stage, terminals 221 and 222 are respectively connected to terminals 228 and 227 of the preceding stage, so as to be connected to the collectors of the right and left-hand transistors, respectively. With this arrangement, biasing signals are applied to prevent shifting of each stage from a "zero" state to a "one" state, unless the preceding stage is in a "one" state.

The first shift register stage can be shifted from a "zero" to a "one" state only when the sample bistable or flip-flop 151 is in place in a set condition by a signal from the scanning repetition rate clock 152 and for this purpose, a negative signal may be applied to terminal 222 from the flip-flop 151 until the flip-flop 151 is placed in a set condition.

The stylus selector gate circuit 108 is connected to an output terminal 230, arranged for applying a signal to one of the spring electrodes 55 of the recorder. Terminal 230 is connected to ground through a resistor 231 and is connected also to the emitter of a transistor 232 which is operated as an emitter-follower, the collector thereof being connected through a low valued resistor 233 to a negative voltage supply terminal 234.

The base of the emitter-follower transistor 232 is connected to the collector of a transistor 235, and also through a resistor 236 to another negative voltage supply terminal 237. The emitter of the transistor 235 is connected to ground while the base thereof is connected through a resistor 238 to the positive voltage supply terminal 185 and also through a resistor 239 to the emitter of a buffer transistor 240 having its collector connected to the negative supply line 192 and having its base connected to the output of a one-shot or monostable multivibrator generally indicated by reference numeral 242.

In the operation of the stylus selector gate circuit as thus far described, the transistor 235 is normally conducting to place the collector thereof and the base of the transistor 232 at a potential close to ground potential.

When the potential of the base of the transistor 240 is moved in a positive direction, conduction through the transistor 235 is reduced, to apply a negative-going signal to the base of the transistor 232 to thus produce a negative voltage at the emitter of the transistor 232, which is applied to the spring electrode which is connected to terminal 230. The recorder then "writes" on the recording medium. To obtain optimum operation, the voltages applied to terminals 234 and 237 may preferably be adjustable.

The one-shot or monostable multivibrator 242 comprises a pair of transistors 243 and 244 having emitters connected to ground and collectors connected through resistors 245 and 246 to the negative voltage supply line 192. The base of the transistor 243 is connected through a resistor 247 to the positive voltage supply line 185 and is also connected to the collector of transistor 244 through the parallel combination of a resistor 248 and a capacitor 249. The base of the transistor 244 is connected through a resistor 250 to the line 192 and also through a capacitor 251 to the collector of the transistor 243 which is connected to the base of the buffer transistor 240.

In operation of the one-shot multivibrator 242, the transistor 243 is normally cut-off while the transistor 244 is conducting heavily. The collector of the transistor 243 is then at a potential close to that of the negative voltage supply line 192 and the transistor 240 is conductive to also render the transistor 235 conductive. To cause a writing operation, a positive signal is applied to the base of the transistor 244 to render the transistor 244 non-conductive and to render the transistor 243 conductive. The buffer transistor 240 is then cut-off and the transistor 235 is also cut-off to cause conduction of the transistor 232 and to thereby cause a writing operation. After a certain time interval dependent upon the time constant of the RC circuit defined by resistor 250 and capacitor 251, the potential of the base of the transistor 244 reaches a value at which it begins to conduct, at which time the transistor 243 is cut-off.

To apply the positive triggering voltage to the base of the transistor 244, it is connected through a diode 253 to a circuit point 254 which is connected to ground through a resistor 255 and through a capacitor 256 to the collector of a transistor 257, the collector of transistor 257 being connected through a resistor 258 to the negative voltage supply line 192. The emitter of the transistor 257 is connected to ground while the base thereof is connected through a resistor 260 to the positive voltage supply line 185, through a resistor 261 to the collector of the transistor 202 of the shift register stage, and through a resistor 262 to a terminal 263 which is connected to the output of the "GO-NO GO" circuit 107.

In operation, the transistor 202 of the shift register stage is normally conducting so that the collector thereof is at a potential close to that of the negative voltage line 192 and the transistor 257 is conductive, to place the collector thereof at a potential close to that of the negative voltage supply line 192. When the shift register stage is shifted from its "zero" state to its "one" state, the collector of the transistor 202 moves in a positive direction. If the signal applied to terminal 263 is then sufficiently positive, the transistor 257 is cut-off, or conduction thereof is sufficiently reduced, to apply a positive voltage to the base of the transistor 244 sufficient to trigger the one-shot multivibrator 242.

FIGURES 8 and 9 show a modified transducer assembly 270 for testing a pipe 271. The assembly 270 comprises eighteen transducers 272 in a ring facing the outer surface of the pipe 271, the transducers 272 being supported on the inner ends of blocks 273 disposed within a support ring 274. Ring 274 is carried by a bar 275, which is supported on the carriage 17 for scanning movement of the assembly 270 in a direction parallel to the axis of the pipe 271. Transducers 272 are connected to terminals 61–78 (FIGURE 6) and a staggered pulsing order is preferably used to obviate the effect of reverberations and to permit pulsing at a rapid rate.

FIGURES 10 and 11 show another modified arrangement 280 for testing a pipe 281, wherein eighteen transducers 282 are supported in a line for transmitting pulses of ultrasonic energy into axially spaced points of the pipe 281. The transducers 282 are supported on the lower faces of blocks 283 which are secured to a plate 284 supported by uprights 285 and 286 from a base 287. The pipe 281 is supported by rollers 288 which may be driven by a suitable drive source, for scanning of the pipe 281. The entire assembly may be immersed in water or other liquid to provide an efficient coupling between the transducers and the pipe. The transducers 282 are connected electrically to the terminals 61–78 (FIGURE 6) and a staggered pulsing order is preferably used.

FIGURE 12 is a view similar to FIGURE 11, showing the support of the transducers 282 to direct ultrasonic beams in a plane spaced from the axis of the pipe 281, so that the ultrasonic energy enters at a substantial angle to the surface of the pipe. This arrangement may be used to detect cracks or other inhomogeneities which may be generally in radial planes.

FIGURE 13 shows an arrangement for testing a relatively thin plate 289, wherein the plate 289 is disposed between the trandsucers 31–48 of the assembly 14 and a back reflection member 290. In using this arrangement the gate 106 may be opened for a time interval at which ultrasonic pulses should be received after travel down through the plate 289 to the surface of the back reflection member 290 and back upwardly through the plate 289 to the transducers 31–48. The loss of a received signal then indicates a defect in the plate 289 and the "GO-NO GO" circuit 107 may be set to operate when the received signal falls below a certain amplitude.

FIGURE 14 shows another still modified arrangement 292 wherein a plate 293 to be tested is disposed between eighteen transmitting transducers 295 and eighteen receiving transducers 296, respectively supported on blocks 297 and 298, carried by bars 299 and 308. In using this arrangement, the transmitting transducers are connected to the outputs of the pulsers 100, but not to the inputs of the gates 104, the receiving transducers being connected to the inputs of gates 104. Gate 106 may be opened for a time interval corresponding to the receipt of a pulse of ultrasonic energy at a receiving transducer 296 after travel from the corresponding transmitting transducer 295 down through the plate 293. In this arrangement, as in the others, a staggered pulsing order is preferably used.

It will be understood that although eighteen transducers are used in the illustrated arrangements, any desired number may be used. For example, to test pipe skelp having a width of 130 inches, 130 transducers could be used with a 1" spacing between center lines thereof, and a suitable staggered pulsing order may be used in accordance with the principles herein disclosed.

It will be understood that other modifications and variations may be used without departing from the spirit and scope of the novel concepts of this invention.

We claim as our invention:

1. In an ultrasonic testing system, transmitting and receiving means for transmitting pulses of ultrasonic energy into a plurality of spaced surface points of a part under test and receiving said pulses after travel through interior portions of the part to generate electrical signals in response to the received pulses, said transmitting and receiving means including a plurality of transducers for transmission of said pulses into said surface points of said part, a plurality of pulsers, clock means, a plurality of control stages controlled from said clock means and each comprising a bistable circuit, said control stages being connected in cascade so that each stage after a first stage is acted upon by a previous stage, means connecting said control stages to said pulsers to effect sequential operation of said pulsers in response to operation of said control stages from said clock means, means connecting said pulsers to said transducers to effect pulsing of said transducers in a staggered order such that at least one other transducer is pulsed between the pulsing of each transducer and the transducers adjacent thereto, a recorder having a plurality of recording elements for recording on a recording medium at a plurality of points at spacings proportional to the spacings of said surface points of the part under test, and gate means respectively controlled synchronously from said control stages for applying said electrical signals to said recording elements to produce on the recording medium a pictorial representation of the characteristics of the part under test.

2. In an ultrasonic testing system as defined in claim 1, said part being a flat plate and said spaced surface points being in a line extending across said flat plate.

3. In an ultrasonic testing system as defined in claim 1, said part being cylindrical in shape and said spaced surface points being in a line parallel to the axis of said part.

4. In an ultrasonic testing system, transmitting and receiving means for transmitting pulses of ultrasonic energy into a plurality of spaced surface points of a cylindrical part under test and receiving said pulses after travel through interior portions of the part to generate electrical signals in response to the received pulses of ultrasonic energy, said transmitting and receiving means including a plurality of transducers, said spaced surface points of said cylindrical part being in a line extending in generally parallel relation to the axis of said part, means for pulsing said transducers in a staggered order such that at least one other transducer is pulsed between the pulsing of each transducer and transducers adjacent thereto, recording means responsive to said electrical signals generated in response to the received pulses of ultrasonic energy, and means for rotating said cylindrical part about its axis.

5. In an ultrasonic testing system as defined in claim 4, said transmitting means being positioned to transmit energy in a plane spaced from the axis of said cylindrical part.

References Cited

UNITED STATES PATENTS

| 2,615,777 | 10/1952 | Deuth | 346—74 |
| 2,848,890 | 8/1958 | Sheldon | 73—67.5 |
| 3,063,290 | 10/1962 | Kaserman et al. | 73—67.8 |
| 3,169,393 | 2/1965 | Stebbins | 73—67.9 |
| 3,285,059 | 10/1966 | Bogle | 73—67.9 |

FOREIGN PATENTS

| 736,464 | 9/1955 | Great Britain. |
| 912,226 | 12/1962 | Great Britain. |

RICHARD C. QUEISSER, *Primary Examiner.*

J. P. BEAUCHAMP, *Assistant Examiner.*